Jan. 16, 1968

M. KNOBEL 3,363,448

FORCE AND MOTION AMPLIFIER

Filed Sept. 8, 1965

INVENTOR.
MAX KNOBEL

BY *Morse, Altman & Oates*

ATTORNEYS

INVENTOR.
MAX KNOBEL

Jan. 16, 1968     M. KNOBEL     3,363,448
FORCE AND MOTION AMPLIFIER
Filed Sept. 8, 1965     3 Sheets-Sheet 3

INVENTOR
MAX KNOBEL
BY
Morse, Altman + Oates
ATTORNEYS

United States Patent Office 3,363,448
Patented Jan. 16, 1968

3,363,448
FORCE AND MOTION AMPLIFIER
Max Knobel, 453 Beacon St., Boston, Mass. 02150
Filed Sept. 8, 1965, Ser. No. 485,829
7 Claims. (Cl. 73—37.6)

ABSTRACT OF THE DISCLOSURE

An apparatus is provided for amplifying forces and motions such as produced by automatic gauging devices. A piston is mounted for reciprocation within a cylinder and is normally maintained in a balanced condition by means of pressurized gas delivered to opposite ends of the cylinder. The gas connections for the cylinder are connected to a nozzle mounted on a spring-biased member and directing a jet of air against a portion of a transducer which moves in response to a monitored condition. The jet of air normally maintains a constant gap with the movable portion of the transducer and the reflected back pressure of the nozzle is connected to one end of the cylinder to maintain the piston in balance. When the transducer member moves in response to a change in the monitored condition the gap changes causing a change in the back pressure and an imbalance in the piston and cylinder, this in turn causing the piston to move in one direction or the other. A cam and follower arrangement between the piston and the spring-biased member returns the gap between the nozzle and the transducer member to its normal size. The piston is connected to a switching system for energizing selected lamps in a bank of lamps to provide a visual output.

Figure 1:
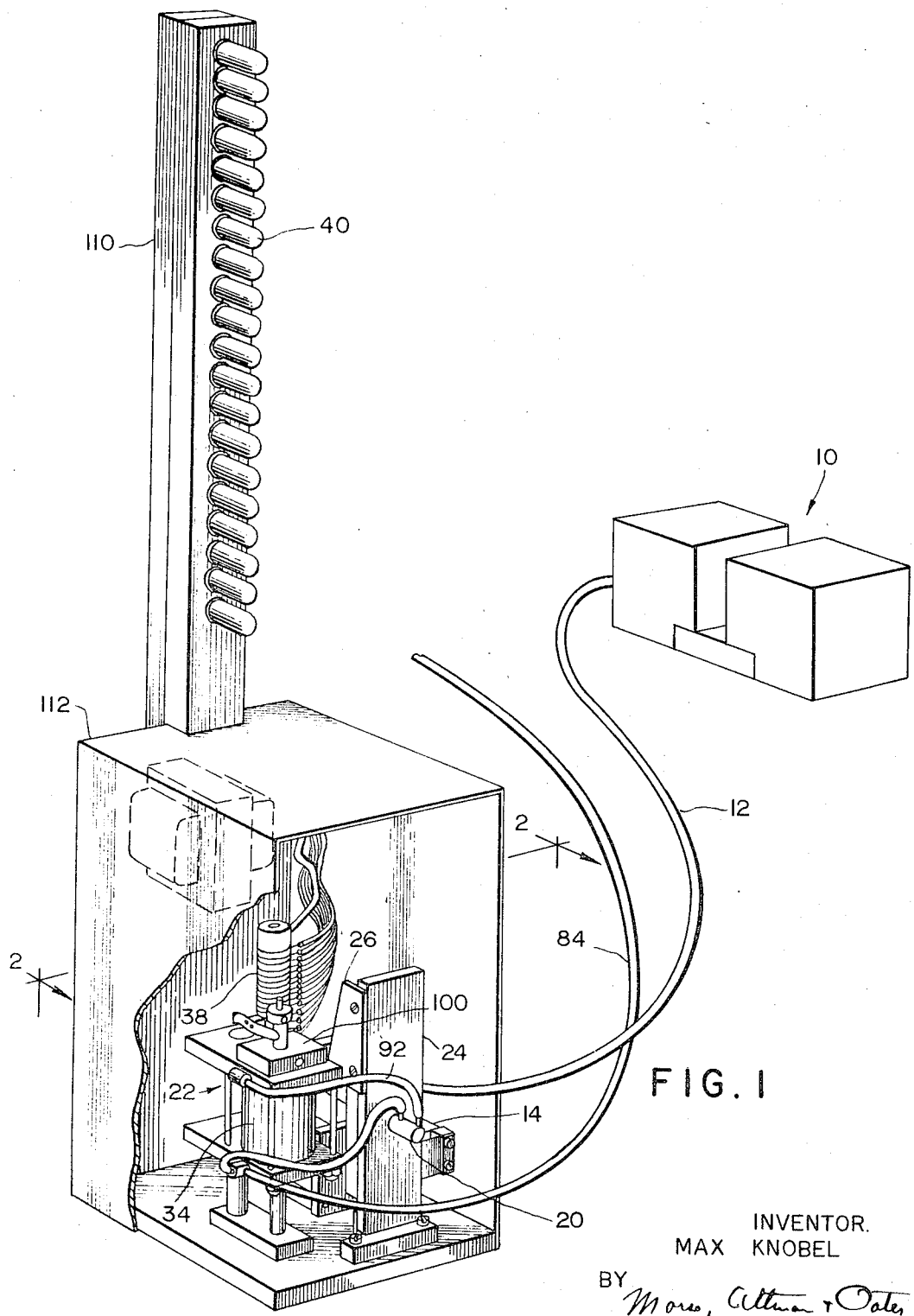

This invention relates generally to force and motion amplifiers and more particularly is directed towards a device adapted to produce a relatively long and powerful movement in response to a relatively small weak movement. In a preferred embodiment this invention has particular utility as an automatic gauging device adapted to produce signals corresponding to the sensed dimensions.

Conventional gauging devices usually employ scaled dials with pointers which respond to the dimension which is being gauged. Devices of this sort normally operate with very light pressures and small movements. Gauging instruments presently available are not suited for long distance viewing but may be read only at short range. Furthermore existing gauging devices are not adapted to produce a strong, accurate output capable of controlling auxiliary equipment with a high degree of precision.

Accordingly, it is an object of the present invention to provide improvements in force and motion amplifiers.

Another object of this invention is to provide a device adapted to convert a relatively small, weak motion into a relatively strong, large motion precisely related thereto.

A further object of this invention is to provide a device adapted to produce a relatively large linear movement which is precisely proportional to a relatively small, weak movement.

A still further object of this invention is to provide an automatic gauging apparatus which is extremely sensitive to the sensed dimensions and adapted to provide a readout visible over a long distance.

More particularly this invention features a force and motion amplifier comprising a pneumatic servo including a double-acting cylinder wherein the pressure on either side of a piston mounted within the cylinder is normally maintained in a balanced condition. A follower nozzle connected to a source of compressed gas and to either end of the cylinder is arranged to direct a jet of air between a spring biased member and a transducer element which is displaced small distances in response to changes in the sensed dimension. This displacement of the transducer element to or away from the spring biased member varies the air gap at the nozzle producing an imbalance in the pneumatic servo. This imbalance causes a relatively long and powerful displacement of the piston which displacement is precisely proportional to the displacement of the transducer element. The displaced piston, through a cam arrangement, returns the spring biased member and the transducer element to a normal gap determined by the gas jet from the nozzle. Simultaneously the piston moves a brush along a commutator to produce an electrical output signal which is precisely related to the change in the sensed dimension. In a preferred embodiment of the invention the commutator is connected to a row of lights which are illuminated according to the position of the brush along the commutator.

Figure 2:
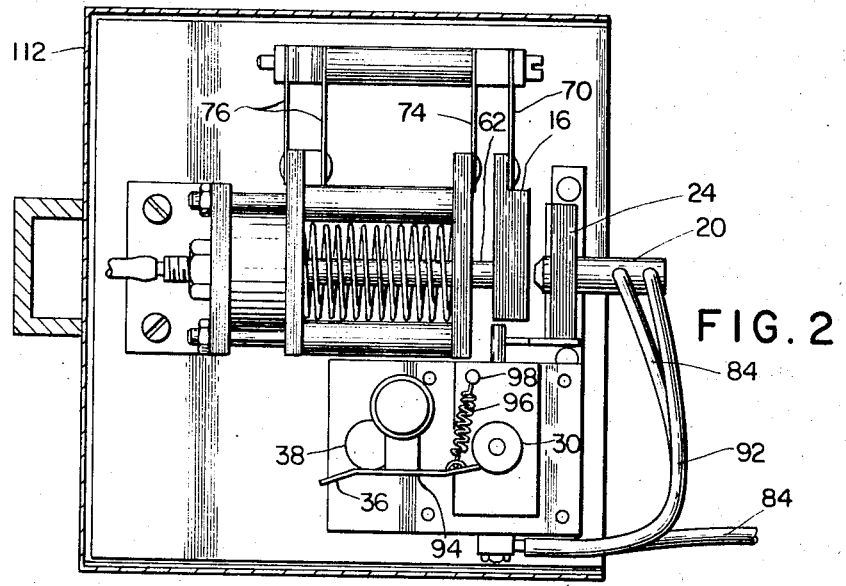
Figure 3:
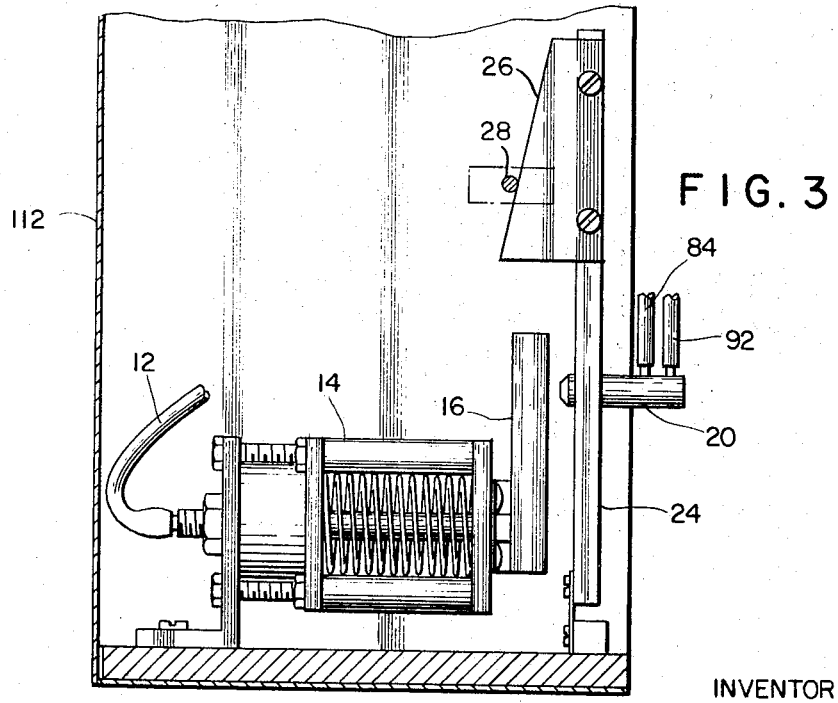
Figure 4:
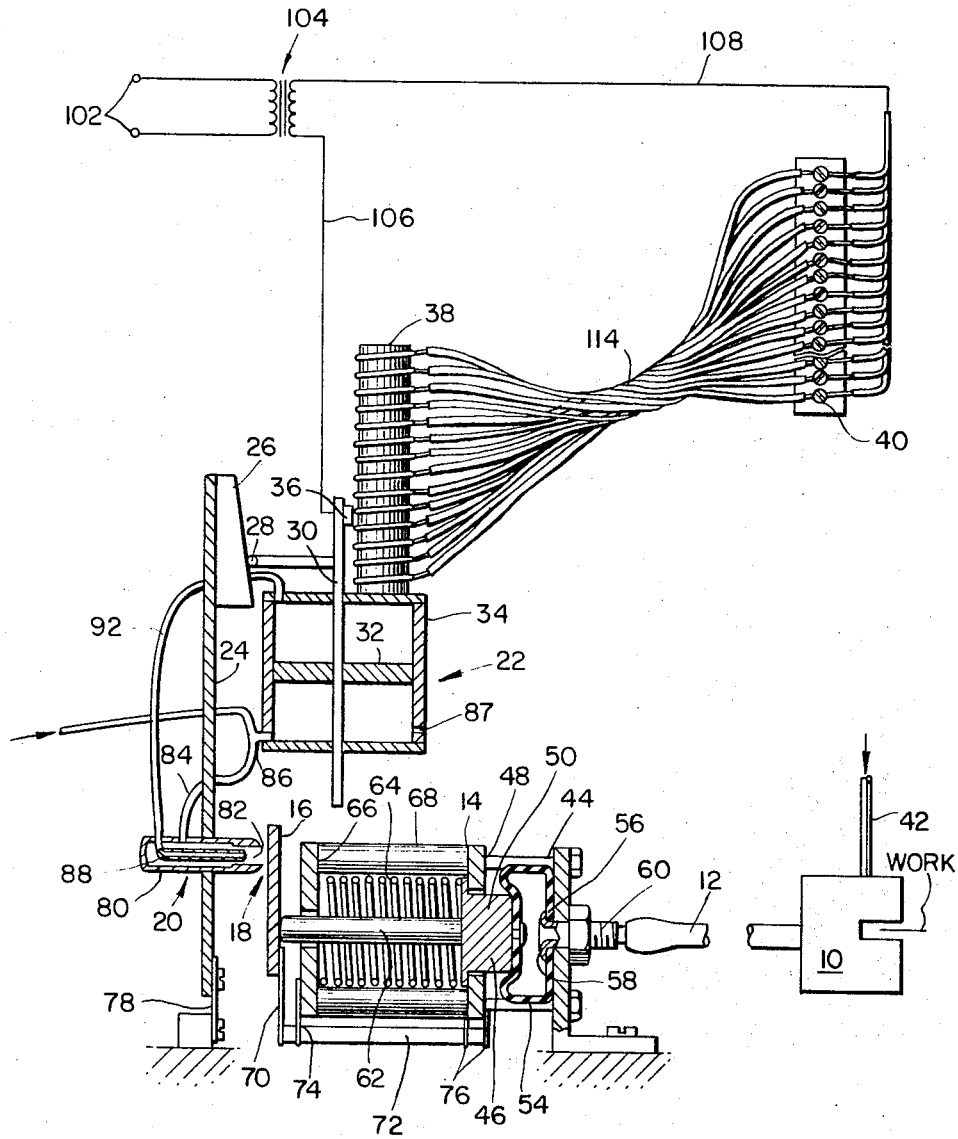

However, these and other features of the invention, along with further objects and advantages thereof, will become more fully apparent from the following detailed description of a preferred embodiment of the invention, with reference being made to the accompanying drawings, in which:

FIG. 1 is a view in perspective of a force and motion amplifier made according to the invention, FIG. 2 is a cross-sectional view taken along the line 2—2 of FIG. 1, FIG. 3 is a detail sectional side view of the transducer, and, FIG. 4 is a schematic diagram of the system.

Referring now to the drawings, the reference character 10 generally indicates an air gauge or the like adapted to transmit air through a tube 12 to a transducer 14 at a pressure that is precisely proportional to a dimension sensed by the gauge. The transducer 14 converts the air pressure signal for the gauge 10 into a displacement of a movable member or plate 16 which displacement has a linear and proportional relation to the signal. The displacement of the plate 16 changes an air gap 18 between the plate 16 and a nozzle 20 for a pneumatic servo described in detail in my U.S. Patent No. 3,194,055 and generally indicated at 22. The nozzle 20, in this embodiment, is carried by a biased member namely a spring-mounted arm 24 which also carries a cam 26. The cam 26 engages a follower 28 mounted to a rod 30 which engages a piston 32. The piston 32 in turn is mounted within a cylinder 34 and is adapted to be axially displaced in response to changes in the gap 18. The displacement of the piston moves the follower against the cam 26 biasing the arm 24 to return the nozzle 20 to a position where the gap is the same as at the start. In practice, the gap 18 remains substantially constant although the nozzle and plate may move to different positions. Displacement of the piston also serves to move a brush 36 along a commutator 38 to illuminate one or more lamps 40 arranged in a row. Thus the illuminated lamps serve as a highly visible representation of the sensed dimension.

The air gauge 10 may be any one of a number of commercially available devices which employ a jet of air to gauge a dimension. For example, the air gauge may be employed to monitor the thickness of a moving web or machined parts. In my U.S. Patent No. 2,692,498 there is disclosed an air gauge suitable for this purpose. In any event, the gauge 10 is connected to a supply of constant pressure air through a tube 42 and delivers air to the transducer 14 at a pressure corresponding to the sensed dimension.

The transducer 14 may be any one a variety of units adapted to produce a motion in response to a given air pressure. For example, Bourdon tubes, convoluted bellows or capsules may be employed to advantage. However, for a high degree of accuracy the transducer of the sort described in my U.S. Patent No. 2,989,991 is preferred. This transducer, as shown in FIG. 4, comprises a cup-shaped member 44 in which is mounted a piston 46 of somewhat smaller external diameter than the internal diameter of the cup. An annulus 48 is secured to the outer end of the cup and has an opening slightly larger than the external diameter of the piston in order to provide a narrow annular crevice 50 around the piston. The piston is formed with a flange 52 adapted to seat against the annulus to serve as a stop for the piston.

A thin flexible membrane 54, preferably of rubber, is disposed within the cup 44. The membrane is provided with a seating flange 56 which is gripped between a lip 58 for a nipple 60 and the cup 44. The membrane is provided with an outer wall engaging portion adapted to lie against the interior of the cup and this portion is connected by a fold with an inner cylindrical portion which lies against the walls of the piston. The construction is such that upon application of pressure the rubber membrane holds and assumes successive positions while maintaining contact with the inner wall of the cup and the outer wall and rear face of the piston. The operation of the device is such that errors due to hysteresis or friction are made negligible and the response of the piston to changes in pressure is extremely precise.

The piston carries a rod 62 which engages at its opposite end with the plate 16. The piston 50 is restrained by a coil spring 64 compressed between the piston and a wall 66. Tie rods 68 join the wall 66 to the cup assembly. To reduce friction in the movement of the rod 62 the plate 16 is supported by thin leaf spring 70 mounted on the end of a pair of tie rods 72. The tie rods, in turn, are mounted to the transducer frame by thin leaf springs 74 and 76.

The arm 24 is mounted in spaced generally parallel relation to the plate 16 by means of a thin, flat spring 78 and is biased to the right as viewed in FIG. 4 so that the tip of the nozzle 20 is normally against the plate 16. The nozzle 20 is of a construction similar to that disclosed in U.S. Patent No. 2,692,498 and comprises a housing 80 having a discharge orifice 82 oppositely the plate 16 and connected by tubing 84 to a source of constant pressure compressed gas such as air, for example. The tubing 84 is also connected by a T 86 through a restricted opening to the lower side of the pneumatic servo cylinder 34. The cylinder is also formed with a restricted opening 87 into the lower cylinder chamber for reasons that will presently appear. Mounted co-axially within the nozzle housing 80 is a tube 88 having a discharge orifice 80 located behind the orifice 82. The tube 88 is connected by tubing 92 to the upper end of the servo cylinder 34.

In practice, compressed air of moderate pressure, perhaps on the order of 30 p.s.i. or so, is fed into the tubing 84 thus charging the lower cylinder chamber through the restricted T opening. The restricted T opening together with the bleeding opening 87 maintains an operating pressure of about 15 p.s.i. in the lower chamber. The upper chamber on the other hand is charged by nozzle back pressure which may vary in operation between 0 and 30 p.s.i. The compressed air also is delivered through the nozzle against the plate 16 and the discharging jet of air serves to bias the nozzle and the arm 24 away from the plate 16 to maintain a gap 18 which remains constant as long as the air pressure remains unchanged and the plate 16 does not move. The action of the jet of air against the plate produces a variable back pressure in the tube 88 which, of course, controls the pressure on the top part of the cylinder 34.

Now, assuming the plate 16 is moved to or away from the nozzle 20 in response to a variation in the dimensions of the gauged work, this will cause the back pressure to be varied either by an increase, if the movement is towards the nozzle, or a decrease, if the movement is away from the nozzle. In any event, the change in the back pressure will affect the balanced condition of the cylinder and the piston will reciprocate according to the change in pressures on either side of the piston. For example, if the plate moves towards the nozzle, the back pressure will increase causing the piston to reciprocate downwardly. This downward reciprocation will cause the cam follower 28 to ride down against the cam 26 thereby pushing the arm 24 to the left as viewed in FIG. 4 thus moving the nozzle away from the plate 16 to return the gap to its original size. The gap 18 will be returned to its original size although the physical positions of the nozzle and plate may be altered.

As the piston is reciprocated downwardly, it moves the brush 36 down the commutator 38 to make contact with certain one or more of the lower conductive segments along the commutator. As best shown in FIG. 2, the brush assembly comprises a wiper arm 94 pivoted to the rod 30 and biased towards the commutator by means of a spring 96 tensioned between the arm and a post 98 mounted on a plate 100 carried by the piston rod 30.

When the brush makes contact with the selected one or more conductive segments on the commutator it completes a circuit to energize a lamp 40. The particular lamp which is lit will provide a highly visible signal corresponding to the change in the sensed dimension. The circuit includes connections 102, a transformer 104 and leads 106 and 108 leading to the brush 36 and row of lamps respectively. Leads 114 connect the commutator segments to the lamps 40.

The row of lamps 40 as shown in FIG. 1 may be mounted on a bracket 110 which is secured to a housing 112 containing the transducer and pneumatic servo. Alternatively the lamps may be mounted at a distance from the transducer and pneumatic servo by merely extending the leads 114 to any desired length. By employing small size lamps several rows of lamps, each row operated by its own gauging unit, may be mounted compactly at one location for monitoring by an operator.

In practice, the lamps may be colored in different fashions to indicate more readily the sensed dimensions. For example, if the device is used to monitor the thickness of a moving web or part, a group of lamps in the center portion of the row may be colored green and their illumination would be an indication the sensed dimension is within a given tolerance. Above and below the green colored lamps there may be a zone of orange lamps whose illumination would indicate the sensed dimension is starting to exceed the given tolerance and the lamps on either end of the row may be colored red to provide a positive indication that the tolerance of the work has been exceeded. It will be appreciated that a color change is more readily observable than the movement of a needle on a gauge or the like.

The unit is particularly useful for gauging small dimensions and providing an output signal which is visible over a relatively long distance. The system is extremely sensitive and precise and offers a very large output signal of great strength in response to a very small, weak input signal. By reason of the fact that the pneumatic servo is operating at pressures on the order of 15 p.s.i. or so the effects of friction between the brush and the commutator may be ignored as being negligible. The force and motion amplification in practice has been found to be both ample and accurate. In one model, a .1" movement of the transducer plate was converted into a 1" motion of the pneumatic servo piston rod. The servo holds a given position very firmly since that position is the result of a balance of forces on the order of 15 lbs. on the two sides of the piston. If the gap changes by .001", several pounds difference in force acts to re-establish the fixed gap. It therefore takes a position very little affected by the small friction of the brush moving along the commutator.

While the invention has been described with particular reference to the illustrated embodiment, it will be understood that numerous modifications thereto will appear to those skilled in the art. By way of illustration, in place of the pneumatic transducer employed to vary the nozzle gap, other types of transducers may be employed. For example, a solenoid device responsive to a work generated electrical signal may be employed to move a surface to or away from the nozzle according to the strength of the input signal. Also, a bi-metallic element responsive to changes in temperature may be employed. Such a bi-metallic device could be employed in place of the plate 16 and would deflect to or away from the nozzle according to the ambient temperature. Thus, the unit could serve as a temperature indicating device.

While the nozzle has been shown mounted on the arm 24 and operating against the plate 16, similar results would be obtained if the nozzle were mounted on the plate 16 and the jet of air directed against the arm 24 insofar it is the air gap produced by the nozzle and the back pressure obtained that provides the control over the pneumatic servo.

Any number of lamps may be employed in any desired arrangement. Also in place of the lamps the brush and commutator may be employed to actuate relays or the like to perform functions such as sorting and the like. For example, when gauging a number of parts, those parts which have tolerances within a particular range may be guided by the action of a relay into one bin while those which are above or below the tolerance may be guided to other bins. For another sorting application the lamps may be located in close relation to a number of bins. Illumination of a particular lamp will indicate that the gauged part should be deposited in the bin over which the illuminated lamp is located. Still further, the powerful motion of the pneumatic servo piston rod could be employed to operate a pen mechanism to make a recording of a continuous gauging operation, for example, of sheet thickness or to make a dot on a chart for intermittent gauging. Also, the brush and commutator may be employed to actuate a readout mechanism which would print out measurements.

Accordingly, the above description and accompanying drawings should be taken as illustrative of the invention and not in a limiting sense.

Having thus described the invention what I claim and desire to obtain by Letters Patent of the United States is:

1. A force and motion amplifier, comprising:
  (a) a cylinder,
  (b) a piston mounted within said cylinder,
  (c) a transducer having a first member adapted to move in response to a change in a monitored condition,
  (d) a second member movably mounted adjacent said first member and means normally urging said second member towards said transducer,
  (e) a nozzle carried by one of said members and adapted to direct a jet of gas against the other of said members to form a gap therebetween,
  (f) first conduit means connecting said nozzle and one end of said cylinder to a source of compressed gas,
  (g) second conduit means connecting said nozzle to the other end of said cylinder for communicating gap controlled back pressure thereto,
  (h) a small movement of said transducer being adapted to change the gap between said first and second members to thereby change the pressure in the other end of said cylinder causing said piston to make a relatively large movement in returning to a balance position, and
  (i) means responsive to piston movement for returning said first and second members to their original relative positions to re-establish said gap.

2. A force and motion amplifier according to claim 1 including a commutator and a brush and means responsive to piston movement for producing a relative movement between said commutator and brush.

3. A force and motion amplifier according to claim 2 including a plurality of lamps connected to said commutator and adapted to be illuminated selectively according to the position of said brush with respect to said commutator.

4. A force and motion amplifier according to claim 1 wherein said transducer comprises a fluid actuated piston and cylinder, work responsive air gauging means connected to said cylinder and adapted to vary the pressure in said cylinder in accordance with variations in the dimensions of the work, said transducer piston being adapted to vary the size of said gap in accordance with pressure variations from said air gauging means.

5. A force and motion amplifier, comprising:
  (a) a cylinder,
  (b) a piston mounted within said cylinder,
  (c) a nozzle,
  (d) a transducer mounted oppositely said nozzle and having a surface adapted to move to or away from said nozzle in response to a change in a monitored condition,
  (e) a biased member movably mounting said nozzle and normally urging said nozzle towards said transducer surface,
  (f) first conduit means connecting said nozzle and one end of said cylinder to a source of compressed gas,
  (g) second conduit means connecting said nozzle to the other end of said cylinder to balance the pressure on either side of said piston,
  (h) a relatively small movement of said transducer being adapted to change the gap between said nozzle and transducer surface to thereby change the pressure in the other end of said cylinder causing said piston to make a relatively large movement and return to a balanced position, and
  (i) means responsive to piston movement for returning said nozzle and transducer surface to their original relative positions.

6. A force and motion amplifier according to claim 5 including a plurality of lamps and switching means connected to said lamps and actuated by said piston whereby selected lamps will be illuminated according to the position of said piston.

7. A work responsive force and motion amplifier, comprising:
  (a) a pneumatic servo,
  (b) a transducer having a first member adapted to move in response to a change in a monitored condition,
  (c) a biased second member normally urged towards said transducer,
  (d) a nozzle carried by one of said members and adapted to direct a gas jet against the other of said members to form a gap therebetween,
(e) conduit means connecting said nozzle to said servo and to a source of compressed gas,
(f) a small movement of said transducer being adapted to change the gap between said members to thereby change the pressure in said servo causing an imbalance therein,
(g) first means responsive to servo imbalance for re-establishing said gap, and
(h) second means responsive to servo imbalance for indicating said change in condition.

References Cited
UNITED STATES PATENTS

| | | | |
|---|---|---|---|
| 2,248,653 | 7/1941 | Allendorff | 33—172 |
| 2,433,585 | 12/1947 | Warner | 33—172 |
| 2,692,495 | 10/1954 | Knobel | 73—37.5 |
| 2,989,991 | 6/1961 | Knobel | 137—788 |
| 3,194,055 | 7/1965 | Knobel | 73—37.5 |

LOUIS R. PRINCE, *Primary Examiner.*

WILLIAM HENRY II, *Assistant Examiner.*